(12) United States Patent
Voelker et al.

(10) Patent No.: US 10,981,546 B2
(45) Date of Patent: Apr. 20, 2021

(54) WHEEL BRUSH AND LUG NUT CLEANER

(71) Applicant: Black Tie Brands, LLC, Miami, FL (US)

(72) Inventors: Scott Voelker, Miami, FL (US); Jonathan Batchelor, Miami, FL (US)

(73) Assignee: BLACK TIE BRANDS, LLC, Miami, FL (US)

( * ) Notice: Subject to any disclaimer, the term of this patent is extended or adjusted under 35 U.S.C. 154(b) by 141 days.

(21) Appl. No.: 16/372,369

(22) Filed: Apr. 1, 2019

(65) Prior Publication Data

US 2019/0248342 A1 Aug. 15, 2019

Related U.S. Application Data

(63) Continuation of application No. 15/387,664, filed on Dec. 22, 2016, now Pat. No. 10,246,061.

(51) Int. Cl.
| | |
|---|---|
| *B60S 3/04* | (2006.01) |
| *A46B 5/00* | (2006.01) |
| *A46B 9/02* | (2006.01) |
| *A46B 5/02* | (2006.01) |

(52) U.S. Cl.
CPC ............ *B60S 3/045* (2013.01); *A46B 5/0016* (2013.01); *A46B 5/0083* (2013.01); *A46B 5/026* (2013.01); *A46B 9/026* (2013.01); *B60S 3/042* (2013.01); *A46B 2200/3046* (2013.01); *A46B 2200/3073* (2013.01)

(58) Field of Classification Search
CPC ........ B60S 3/045; B60S 3/042; A46B 5/0016; A46B 5/0083; A46B 5/026; A46B 9/026
See application file for complete search history.

(56) References Cited

U.S. PATENT DOCUMENTS

| | | | |
|---|---|---|---|
| 3,693,128 | A | 9/1972 | Jacobs, Jr. |
| 4,117,566 | A | 10/1978 | Ward |
| 5,123,763 | A | 6/1992 | Simmons |
| 5,806,128 | A | 9/1998 | Love |
| 6,473,930 | B1 | 11/2002 | Ortega |
| 6,754,932 | B2 | 6/2004 | Buzard |
| 7,356,867 | B1 | 4/2008 | Beiemlann |
| 7,631,385 | B2 | 12/2009 | Schouten |
| 8,365,338 | B1 | 2/2013 | Figaro |

(Continued)

*Primary Examiner* — Shay Karls
(74) *Attorney, Agent, or Firm* — Mark C. Johnson; Johnson Dalal

(57) ABSTRACT

A wheel brush and lug nut cleaner having a handle with a rear portion and a front portion operably configured to pivot with respect to one another utilizing a pivot pin with a plurality of grooves disposed along an external perimeter thereof. The rear portion has a spring-loaded release mechanism disposed therein and having an accessible release button and a lock tab in operational communication with the release button, wherein the accessible release button is operably configured to move the lock tab to a disengaged position and an engaged position with respect to the plurality of grooves, the disengaged position operably configured to enable pivoting of the front portion with respect to the rear portion and the engaged position operably configured prevent pivoting of the front portion with respect to the rear portion. The device also includes a brush head with a plurality of bristles disposed thereon.

15 Claims, 4 Drawing Sheets

(56) References Cited

U.S. PATENT DOCUMENTS

| | | | |
|---|---|---|---|
| D693,128 S | 11/2013 | Williams et al. | |
| 8,869,658 B2 * | 10/2014 | Chou | B25G 1/007 |
| | | | 81/177.8 |
| 9,283,595 B1 | 3/2016 | Cooper | |
| 2009/0282634 A1 * | 11/2009 | Pardini | A46B 7/02 |
| | | | 15/172 |

* cited by examiner

WHEEL BRUSH AND LUG NUT CLEANER

FIELD OF THE INVENTION

The present invention relates to vehicle wheel and lug nut cleaning devices, and more particularly, to an integrated wheel and lug nut cleaning device.

BACKGROUND OF THE INVENTION

Various types of vehicle wheel cleaning tools and vehicle lug nut cleaning tools are known in the prior art. Many of such known tools clean only the wheel or the lug nut, thereby requiring more than one device to clean both. In addition, such tools include an elongated handle, which does not permit sufficient force to vigorously and thoroughly clean the wheel and lug nuts. Further, some of the wheel and lug nut cleaning tools are motorized with a motor that does not have enough power for thorough cleaning, requires regular replacement of batteries, or requires an extension cord to plug the tools into an electric power source. Even still, several of the known wheel and lug nut cleaning tools do not provide a brush that is removable and washable. However, what is needed, and what the present wheel and lug nut cleaning device provides, is a single wheel and lug nut cleaning device to clean an outer side of a wheel rim and an inner wheel rim behind and between the wheel spokes, where road grime and dirty brake dust tends to collect, as well as each lug nut itself and any and all rim cavities around the lug nuts, where road grime and brake dust additionally tends to collect. The instant device eliminates exposed metal parts in order to prevent scratching of and damage to the rim surface paint and the clear coat over the vehicle's paint in contrast to known wheel cleaning devices which have metal in a handle thereof to hold the bristles in place which, in turn, can rub against, scratch, and otherwise damage the rim and the paint on the vehicle. The present device further accommodates the cleaning of wheel rims in a wide range of sizes thereby eliminating the need for different tools for cleaning different cars.

Therefore, a need exists to overcome the problems with the prior art as discussed above.

SUMMARY OF THE INVENTION

The general purpose of the present wheel brush and lug nut cleaner, described subsequently in greater detail, is to provide a wheel brush and lug nut cleaner which has many novel features that result in a wheel brush and lug nut cleaner which is not anticipated, rendered obvious, suggested, or even implied by prior art, either alone or in combination thereof.

To accomplish this, the present wheel and lug nut cleaning device provides a single tool for cleaning an outer side of a wheel rim and an inner wheel rim behind and between the wheel spokes, the lug nuts, and any and all rim cavities around the lug nut, where road grime and dirty brake dust tends to collect. The instant device includes a cylindrical handle having a rear portion and a releasable front portion pivotably disposed on the rear portion. The front portion has a brush head disposed thereon for cleaning an outer side of a wheel rim and an inner wheel rim behind and between the wheel spokes, wherein road grime and dirty brake dust tends to collect. The rear portion has a lug nut and rim cavity-cleaning body disposed thereon for cleaning any and all rim cavities around the lug nuts, where road grime and brake dust additionally tend to collect. An annular knuckle guard, circumferentially disposed on the handle front portion, is provided to protect the user's knuckles when reaching in to clean a vehicle wheel.

The brush head has a resilient non-abrasive longitudinal shaft and a plurality of bristles radially disposed along the entire longitudinal shaft. Each of first bristle set and a second bristle set extending forwardly from the exterior end and rearwardly from the interior end, respectively, has a convex outer end and a V-shaped inner end to facilitate cleaning crevices, corners, and concave surfaces of the wheel and behind the spoke edges, respectively.

The lug nut and rim cavity-cleaning body has an annular central base with a central core longitudinally disposed therein and a channel continuously disposed between the central core and the central base. A plurality of spaced apart substantially parallelepiped flexible cleaning flanges, preferably formed of microfiber, extends rearwardly from the central base and provides a soft cleaning surface which has the ability to fit into and rotate around the wheel lug nuts, such that the lug nuts themselves and the walls of the wheel rim surrounding the lug nuts are cleaned simultaneously while the user inserts the lug nut and rim cavity-cleaning body into and out of each of the lug nuts. Thus, has been broadly outlined the more important features of the present wheel and lug nut cleaning device so that the detailed description thereof that follows may be better understood and in order that the present contribution to the art may be better appreciated.

In one embodiment of the present invention, a wheel brush and lug nut cleaner is disclosed that includes a handle having a rear portion with a forward end, a rearward end, and a center portion disposed between the forward end and the rearward end of the rear portion and a front portion with a forward end and a rearward end, wherein the rearward end of the front portion operably configured to pivot upwardly and downwardly relative to the rearward end of the rear portion. The cleaning brush also includes a pivot pin rotatably disposed through the rearward end of the front portion and the forward end of the rear portion and having a plurality of grooves disposed along an external perimeter thereof. The brush may also include a chamber disposed within the center portion of the rear portion with a spring-loaded release mechanism disposed therein and having an accessible release button and a lock tab in operational communication with the release button, wherein the accessible release button operably configured to move the lock tab to a disengaged position and an engaged position with respect to the plurality of grooves, the disengaged position operably configured to enable pivoting of the front portion with respect to the rear portion and the engaged position operably configured prevent pivoting of the front portion with respect to the rear portion. The brush also includes a brush head having a resilient non-abrasive longitudinal shaft, an exterior end, an interior end disposed on the forward end of the front portion, a longitudinal shaft length separating the exterior and interior ends of the longitudinal shaft, and a plurality of bristles extending outwardly radially from the longitudinal shaft and along the longitudinal shaft length.

In another embodiment of the present invention, the plurality of bristles includes a first bristle set extending forwardly from the exterior end of the longitudinal shaft and directed forwardly therefrom and a second bristle set of the plurality of bristles extending rearwardly from the interior end of the longitudinal shaft.

In a further embodiment of the present invention, a lug nut and rim cavity-cleaning body is disposed on the rearward end of the rear portion, the lug nut and rim cavity-cleaning body having an central base, a plurality of spaced apart flexible cleaning flanges extending rearwardly from the central base, and a gap disposed between each of the cleaning flanges.

In another exemplary embodiment of the present invention, the handle includes a notch centrally disposed on the forward end of the rear portion, wherein the rearward end of the front portion is disposed within the notch. Additionally, the chamber may be disposed proximal to the forward end of the rear portion of the handle and in a position rearwardly disposed relative the pivot pin. Additionally, the accessible release button may be transversely disposed on the center portion and the lock tab longitudinally disposed within the chamber.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
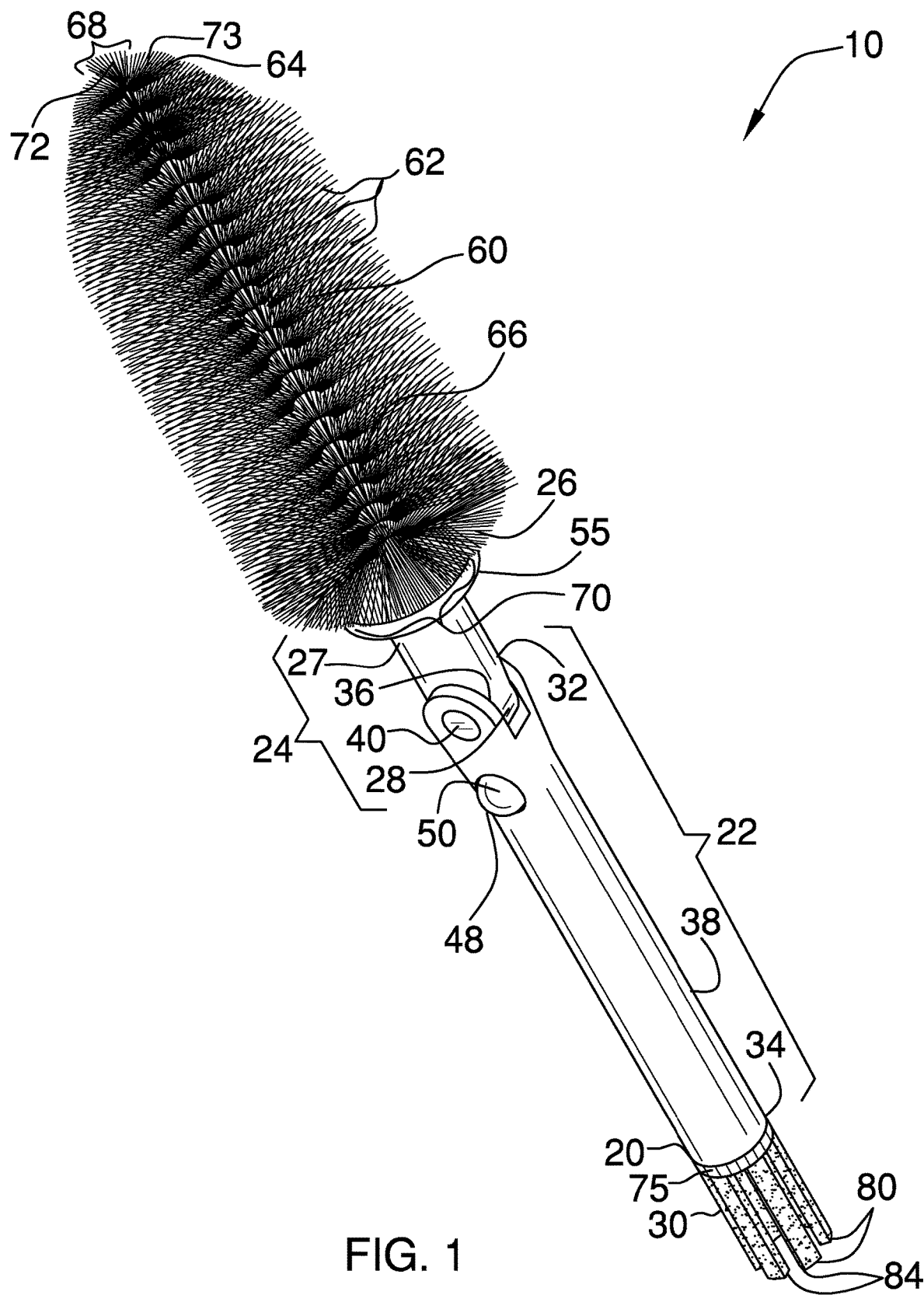
FIG. 1 is a front isometric view.
Figure 2:
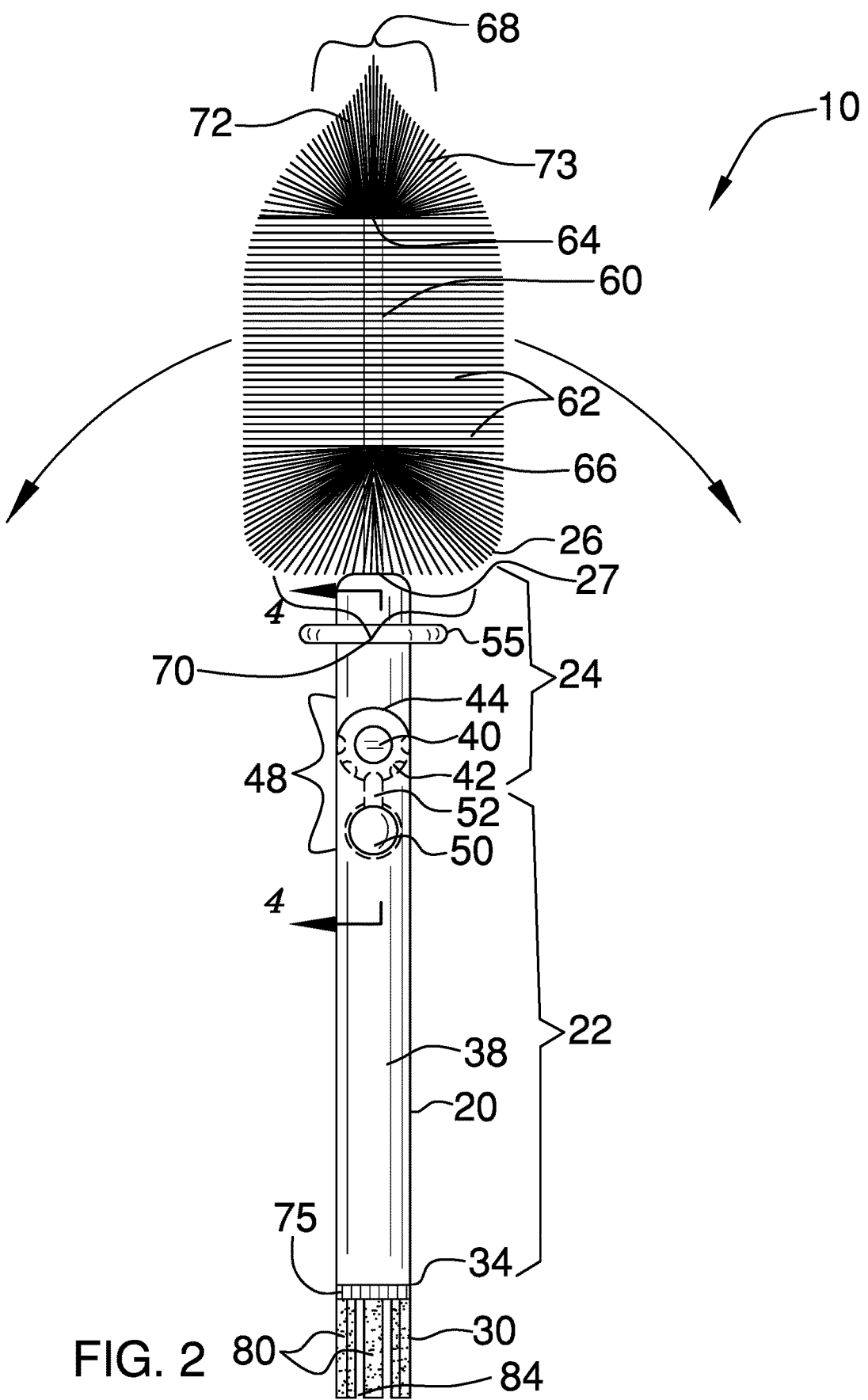
FIG. 2 is a side elevation view.
Figure 3:
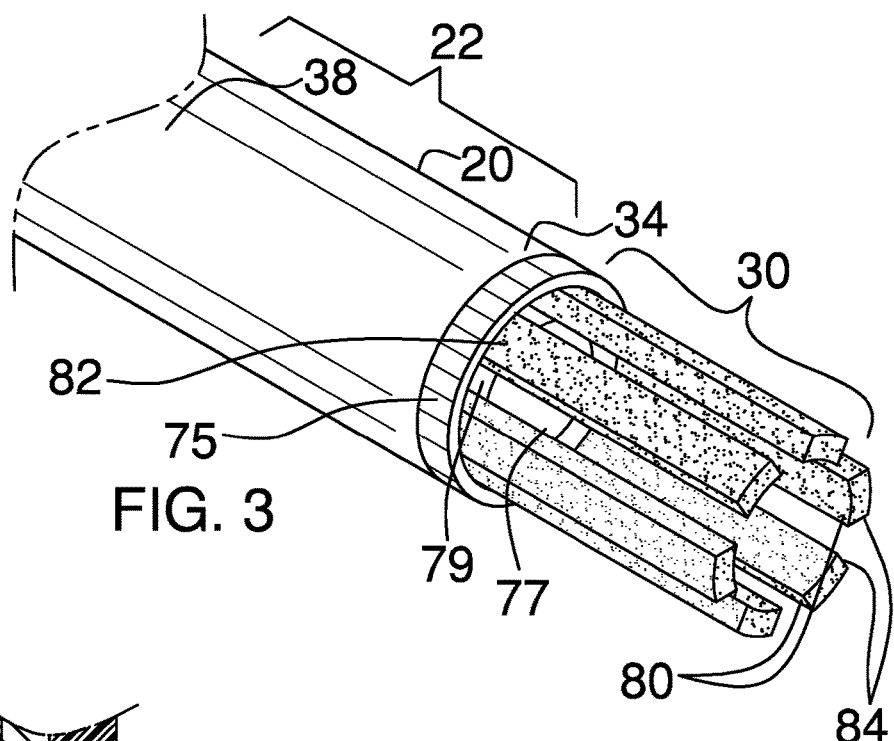
FIG. 3 is a detail isometric view of a lug nut and rim cavity-cleaning body.
Figure 4:
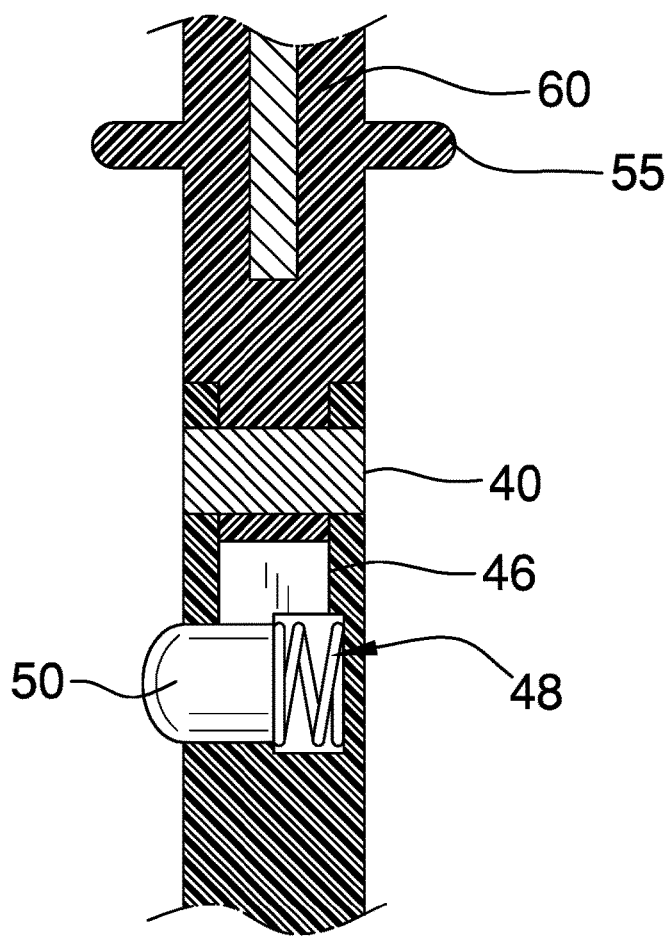
FIG. 4 is a cross-sectional view taken along line 4-4 of FIG. 2.
Figure 5:
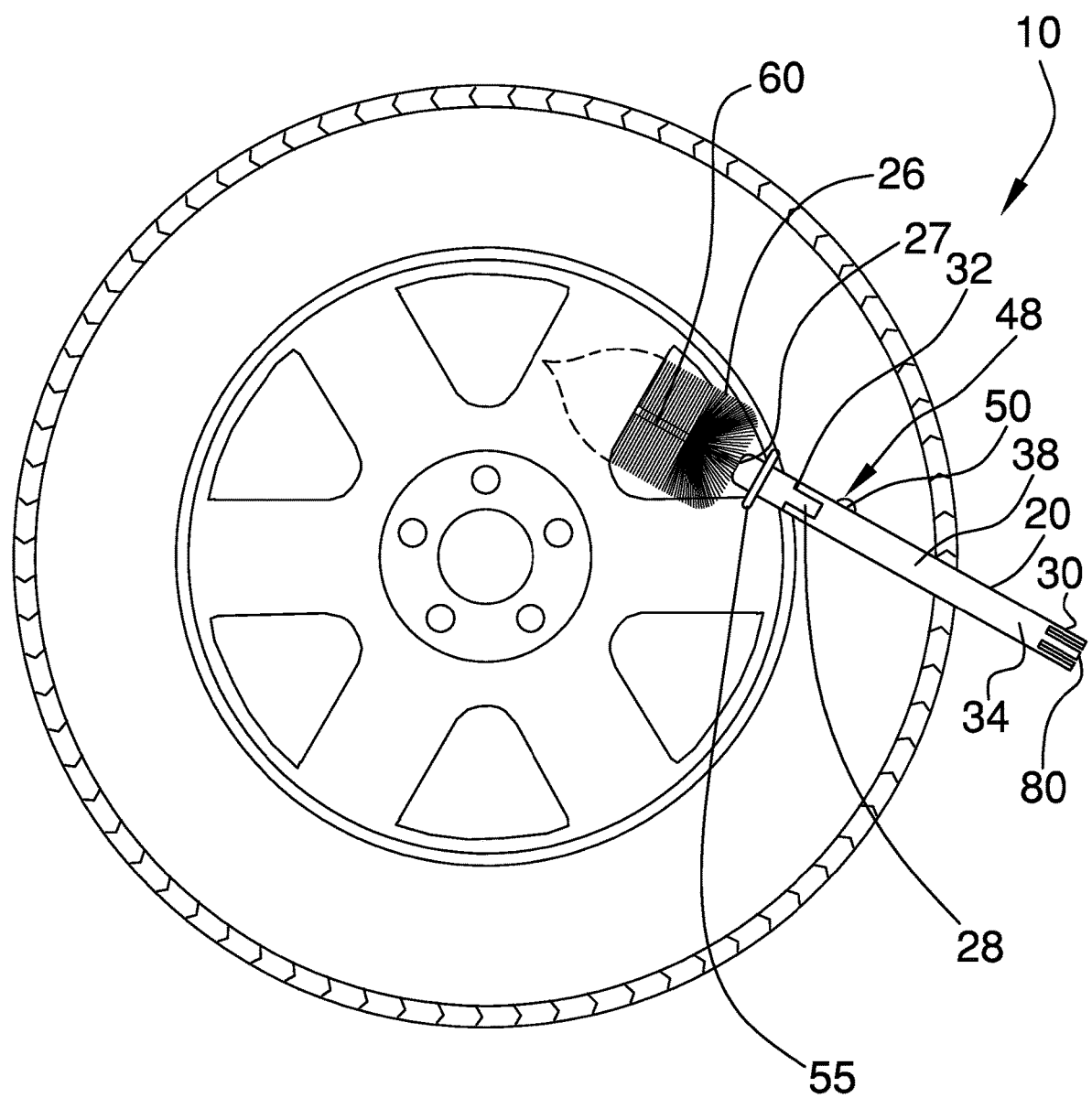
FIG. 5 is an in-use view of a brush head of a wheel brush and lug nut cleaner shown being used to clean an inner wheel rim behind a wheel spoke.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. With reference now to the drawings, and in particular FIGS. 1-5 thereof, an example of the instant wheel brush and lug nut cleaner employing the principles and concepts of the present wheel brush and lug nut cleaner and generally designated by the reference number 10 will be described.

Referring to FIGS. 1-5, the present wheel brush and lug nut cleaner 10 is illustrated. The wheel brush and lug nut cleaner 10 includes a cylindrical handle 20 having a rear portion 22, a releasable front portion 24 pivotably disposed on the rear portion 22. The front portion 24 has a brush head 26 disposed thereon for cleaning an outer side of a wheel rim and an inner wheel rim behind and between the wheel spokes, wherein road grime and dirty brake dust tends to collect. The front portion 24, with the attached brush head 26, is pivotable upwardly and downwardly relative the rear portion 22. The front portion 24 has a forward end 27 and a rearward end 28. The rear portion 22 has a lug nut and rim cavity-cleaning body 30 disposed thereon for cleaning any and all rim cavities around the lug nuts, where road grime and brake dust additionally tend to collect. The rear portion 22 has a forward side or end 32, a rearward side or end 34, a notch 36 centrally disposed on the forward side or end 32, and a center portion 38 between the forward side or end 32 and the rearward side 34.

A pivot pin 40 is rotatably disposed through the rearward end 28 of the front portion 24 and the forward side 32 of the rear portion 22. The pivot pin 40 has a plurality of grooves 42 disposed along an external perimeter 44 thereof. A chamber 46 is disposed within the center portion 38 of the rear portion 22 proximal the forward side 32 in a position rearwardly disposed relative the pivot pin 40. A spring-loaded release mechanism 48 is disposed within the chamber 46. The release mechanism 48 includes an accessible release button 50 transversely disposed on the center portion 36 and a lock tab 52 longitudinally disposed within the chamber 46 and in operational communication with the release button 50. Upon the exertion of pressure on and the alternate release of pressure from the release button 50, the lock tab 52 disengages from the plurality of grooves 42 and alternately engages one of the plurality of grooves 42, respectively. Upon the disengagement of the lock tab 52 from the plurality of grooves 42, the front portion 24 is released or enabled to pivot from the rear portion 22. Upon the engagement of the lock tab 52 with one of the plurality of grooves 42, the front portion 24 is secured to the rear portion 22, i.e., as shown in the figures, the front portion 24 is prevented from pivoting respect to the rear portion 22.

An annular knuckle guard 55 is circumferentially disposed on the handle 20 front portion 24 approximately midway between the forward end 27 and the rearward end 28. The knuckle guard 55 is provided to protect the user's knuckles when reaching in to clean a vehicle wheel.

The brush head 26 has a resilient non-abrasive longitudinal shaft 60 and a plurality of bristles 62 radially disposed along the entire longitudinal shaft 60. The longitudinal shaft 60 has an exterior end 64 and an interior end 66 disposed on the forward end 27 of the front portion 24. A first bristle set 68 of the plurality of bristles 62 extends forwardly from the exterior end 64 and directed forwardly therefrom. A second bristle set 70 of the plurality of bristles 62 extends rearwardly from the interior end 66. Each of the first bristle set 68 and the second bristle set 70 of the plurality of bristles 62 has a convex outer end 72 and a V-shaped inner end 73.

The lug nut and rim cavity-cleaning body 30 is disposed on the rearward side 34 of the rear portion 22. The lug nut and rim cavity-cleaning body 30 has an annular central base 75 disposed on the rearward side 34. The central base 75 has a central core 77 longitudinally disposed therein and a channel 79 continuously disposed between the central core 77 and the central base 75.

A plurality of spaced apart substantially parallelepiped flexible cleaning flanges 80 extends rearwardly from the central base 75. Each of the plurality of cleaning flanges 80 has an external side 82 disposed within the channel 79 and is attached to the central base 75. A gap 84 is disposed between each of the cleaning flanges 80. Each of the plurality of cleaning flanges 80 a cleaning surface preferably of microfiber. The microfiber surface provides a soft cleaning surface which has the ability to fit into and rotate around the wheel lug nuts, such that the lug nuts themselves and the walls of the wheel rim surrounding the lug nuts are cleaned simultaneously while the user inserts the lug nut and rim cavity-cleaning body 30 into and out of each of the lug nuts.

What is claimed is:

1. A wheel brush and lug nut cleaner comprising:
a handle having:
   a rear portion with a forward end, a rearward end, and a center portion disposed between the forward end and the rearward end of the rear portion; and
   a front portion with a forward end and a rearward end, the rearward end of the front portion operably configured to pivot upwardly and downwardly relative to the rearward end of the rear portion;
a pivot pin rotatably disposed through the rearward end of the front portion and the forward end of the rear portion and having a plurality of grooves disposed along an external perimeter thereof;
a chamber disposed within the center portion of the rear portion with a spring-loaded release mechanism disposed therein and having an accessible release button and a lock tab longitudinally oriented within the chamber and in operational communication with the release button, the accessible release button operably configured to move the lock tab to a disengaged position and an engaged position with respect to the plurality of grooves, the disengaged position operably configured to enable pivoting of the front portion with respect to the rear portion and the engaged position operably configured prevent pivoting of the front portion with respect to the rear portion by having the longitudinally oriented lock tab engaged within one of the plurality of grooves that is oriented at least partially toward the rearward end of the rear portion; and
a brush head having a resilient non-abrasive longitudinal shaft, an exterior end, an interior end disposed on the forward end of the front portion, a longitudinal shaft length separating the exterior and interior ends of the longitudinal shaft, and a plurality of bristles extending outwardly radially from the longitudinal shaft and along the longitudinal shaft length.

2. The wheel brush and lug nut cleaner according to claim 1, wherein the plurality of bristles further comprises:
a first bristle set extending forwardly from the exterior end of the longitudinal shaft and directed forwardly therefrom; and
a second bristle set of the plurality of bristles extending rearwardly from the interior end of the longitudinal shaft.

3. The wheel brush and lug nut cleaner of claim 2 wherein:
each of the first bristle set and the second bristle set of the plurality of bristles has a convex outer end and a V-shaped inner end.

4. The wheel brush and lug nut cleaner according to claim 1, further comprising:
a lug nut and rim cavity-cleaning body disposed on the rearward end of the rear portion, the lug nut and rim cavity-cleaning body having a central base, a plurality of spaced apart flexible cleaning flanges extending rearwardly from the central base, and a gap disposed between each of the cleaning flanges.

5. The wheel brush and lug nut cleaner of claim 4, wherein:
the central base is annular, the central base has a central core longitudinally disposed therein and a channel continuously disposed between the central core and the central base, and wherein each of the plurality of cleaning flanges has an external side disposed within the channel and attached to the central base.

6. The wheel brush and lug nut cleaner of claim 5, wherein:
each of the plurality of cleaning flanges has a microfiber cleaning surface.

7. The wheel brush and lug nut cleaner according to claim 1, wherein the handle further comprises:
a notch centrally disposed on the forward end of the rear portion, wherein the rearward end of the front portion is disposed within the notch.

8. The wheel brush and lug nut cleaner according to claim 1, wherein:
the chamber is disposed proximal to the forward end of the rear portion of the handle and in a position rearwardly disposed relative the pivot pin.

9. The wheel brush and lug nut cleaner according to claim 1, wherein:
the accessible release button is transversely disposed on the center portion.

10. The wheel brush and lug nut cleaner according to claim 1, further comprising:
an annular knuckle guard circumferentially disposed on the handle front portion approximately midway between the forward end and the rearward end.

11. A wheel brush and lug nut cleaner comprising:
a handle having a rear portion a rearward end and a front portion with a forward end;
a brush head having a resilient non-abrasive longitudinal shaft, an exterior end, an interior end disposed on the forward end of the front portion, a longitudinal shaft length separating the exterior and interior ends of the longitudinal shaft, and a plurality of bristles extending outwardly radially from the longitudinal shaft and along the longitudinal shaft length; and
a lug nut and rim cavity-cleaning body disposed on the rearward end of the rear portion, the lug nut and rim cavity-cleaning body having a central base, a plurality of spaced apart flexible cleaning flanges extending rearwardly from the central base and disposed in parallel configuration with one another forming a cylindrical shape and defining a cylindrical channel for receiving a lug nut, and a gap disposed between each of the cleaning flanges.

12. The wheel brush and lug nut cleaner according to claim 11, wherein the handle further comprises:
a forward end of the rear portion;
a rearward end of the front portion; and
a center portion disposed between the forward end and the rearward end of the rear portion, wherein the rearward end of the front portion is operably configured to pivot upwardly and downwardly relative to the rearward end of the rear portion.

13. The wheel brush and lug nut cleaner according to claim 12, further comprising:
a pivot pin rotatably disposed through the rearward end of the front portion and the forward end of the rear portion and having a plurality of grooves disposed along an external perimeter thereof; and
a chamber disposed within the center portion of the rear portion with a spring-loaded release mechanism disposed therein and having an accessible release button and a lock tab in operational communication with the release button, the accessible release button operably configured to move the lock tab to a disengaged position and an engaged position with respect to the plurality of grooves, the disengaged position operably configured to enable pivoting of the front portion with respect to the rear portion and the engaged position operably configured prevent pivoting of the front portion with respect to the rear portion.

14. The wheel brush and lug nut cleaner according to claim 13, wherein the handle further comprises:
a notch centrally disposed on the forward end of the rear portion, wherein the rearward end of the front portion is disposed within the notch.

15. The wheel brush and lug nut cleaner according to claim 11, wherein the plurality of bristles further comprises:
a first bristle set extending forwardly from the exterior end of the longitudinal shaft and directed forwardly therefrom; and
a second bristle set of the plurality of bristles extending rearwardly from the interior end of the longitudinal shaft.

* * * * *